United States Patent Office 2,930,443
Patented Mar. 29, 1960

2,930,443

STATIONARY LIQUID PHASE FOR GAS CHROMATOGRAPHY

John C. Lamkin, Independence, Mo., assignor to Standard Oil Company, Chicago, Ill., a corporation of Indiana No Drawing. Application September 27, 1957
Serial No. 686,578

8 Claims. (Cl. 183—2)

This invention relates to the analysis of fluids by means of a partitioning solvent. More particularly the invention relates to a stationary liquid phase for use in gas chromatography.

Many types of material for use as a stationary liquid phase have heretofore been proposed or tried for effecting the partition of the components in a stream undergoing gas chromatographic analysis. It is apparent that for a stationary phase to be useful in this type of system it must be stable under the operating conditions of the column, must be selective in its solution of certain components, and must be capable of uniform distribution upon a finely divided solid support or screen and the like used to support the stationary liquid phase. It is with respect to the stationary liquid phase that this invention relates.

It is, therefore, an important object of this invention to provide a stable liquid phase packing for use in the separation and analysis of complex mixtures of volatile materials. It is a further object of the invention to provide a gas liquid partition column packed with an inert material on which the liquid phase is supported. It is also an object of the invention to provide a liquid which is sufficiently high boiling so as not to be eluted from the column. An additional object of the invention is to provide such a liquid phase having a viscosity which is low so that gases dissolved therein can be eluted from it easily to obtain sharp elution peaks with good symmetry. A further object of the invention is to provide a packing adapted to perform a wide range of separations without resorting to columns having two or more stationary liquid phases which are difficult to prepare and to duplicate. These and other objects of the invention will become apparent as the description thereof proceeds.

Briefly, according to my invention I employ safrol or isosafrol as the stationary liquid phase which comprises about 30 to 40 weight percent of the column packing. Safrol boils at 233° C. and its viscosity is about 23 millipoises at 25° C. which is low for such a high boiling compound. In addition to these several properties the structure of safrol favors hydrogen bonding. Safrol is 1-allyl 3,4 methylenedioxybenzene and has the following structural formula:

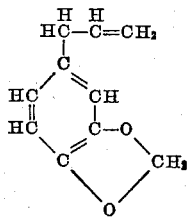

Isosafrol boils at about 250° C., has a viscosity of about 40 millipoises at 25° C. and has the following structural formula:

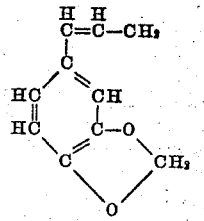

Hydrogen bonding is believed to be at least partly responsible for the separation of unsaturated isomers and heretofore N-N dimethyl formamide and 2,5 hexanedione have been proposed as stationary liquid phases. Each of these compounds has electrons available for bonding and might be used to separate $C_4$ isomers. However both boil more than 40° C. below safrol and isosafrol and are objectionably eluted from chromatographic columns at room temperature. Accordingly, to use these compounds it has been necessary to refrigerate the column or replace the stable phase frequently and this limits the utility of the stationary liquid phase. For example, the $C_5$ isomers cannot be eluted from a refrigerated column in any reasonable length of time. On the other hand, I have found my stationary liquid phases to give most of the separations as the aforementioned compounds, plus several others; for example, propylene from isobutane, acetylene from ethane, carbon dioxide from ethane, and many of the $C_5$ and $C_6$ isomers.

Safrol is particularly suited for analysis of gaseous and liquefied petroleum gas samples resulting from cracking operations. Neither N-N dimethyl formamide nor 2,5 hexanedione can be used to separate propylene from isobutane, whereas safrol gives excellent results. The pentanes are easily eluted from safrol columns at room temperature. Accordingly, the safrol packing shortens and simplifies the analysis of complex samples containing $C_2$ through $C_5$ hydrocarbons. The packing is also uniquely adaptable for use in the separation of $C_5$ and $C_6$ hydrocarbons.

To demonstrate the utility and advantages of my stationary liquid phase I have made a number of separations in a packed column comprising a stainless steel tube 12 feet long and having an inside diameter of 4 mm. The packing was safrol supported on C-22 Firebrick (Fisher Scientific Company). About 0.45 gram of safrol were supported per gram of firebrick. The column was packed in the usual manner.

Retention times obtained at 80° F. with a flow of 70 ml./min. of helium were as follows:

*Retention times of many compounds on 12-foot safrol column (4 mm. I.D.)*

| Component: | Retention time (minutes) |
|---|---|
| Air+methane | 1.55 |
| Ethane+ethylene | 1.84 |
| Carbon dioxide | 1.96 |
| Actylene | 2.20 |
| Propane | 2.80 |
| Propylene | 3.16 |
| Hydrogen sulfide | 3.64 |
| Isobutane | 4.25 |
| n-Butane+neopentane | 5.96 |
| Isobutylene+butene-1 | 7.10 |
| Trans butene-2 | 8.75 |
| Cis butene-2+butadiene 1-3 | 10.10 |
| Isopentane | 12.00 |
| n-Pentane | 15.75 |
| Pentene-1 | 19.00 |
| 2,2-dimethyl butane | 23.30 |
| 2-methyl butene-2 | 27.80 |

Each column gave excellent separation of ethane, carbon dioxide, acetylene, propane, propylene, hydrogen sulfide, isobutane, n-butane, cis and trans butene-2, isopentane, and n-pentane.

From the above it will be apparent that I have attained the objects of my invention and have provided a stationary liquid phase packing for a gas chromatography column wherein the difficulties of the prior art are avoided and excellent separations of the $C_2$ to $C_6$ hydrocarbons and isomers can be obtained at essentially room temperature.

The invention has been described with reference to preferred embodiments but it is to be understood that these are by way of illustration only. Accordingly, it is contemplated that modifications and variations can be made in the operating techniques without departing from the spirit of the invention.

What I claim is:

1. In the analysis of difficultly separated mixtures of volatile materials, the method which comprises passing such a mixture at substantially ambient temperature through an elongated mass of inert supporting material having thereon a stationary liquid phase consisting essentially of a safrol which comprises a weight percent of said elongated mass sufficient to effect the desired analysis.

2. An improved method for separating difficultly separated complex gaseous and liquid mixtures containing $C_2$ to $C_6$ hydrocarbons which comprises the steps of passing such mixtures combined with a carrier gas in contact with a stationary liquid phase supported on a packing and consisting essentially of a safrol which comprises a weight percent of the packing sufficient to effect the desired separation.

3. The method of separating and identifying $C_2$–$C_6$ hydrocarbon components of a complex petroleum hydrocarbon mixture which comprises the steps of introducing such complex mixture into a stream of carrier gas, flowing the combined stream and mixture into contact with an extended film of a stationary liquid phase supported on an inert packing and consisting essentially of safrol in concentration sufficient to effect the desired separation whereby the individual components of the mixture are retained by said film in different zones thereof so that the individual components are expelled from the liquid phase and discharged from the contacting zones successively upon being eluted from the film.

4. An apparatus for conducting gas chromatographic analyses which includes an elongated column, an inert packing within said column, and a stationary liquid phase on said packing, said liquid phase consisting essentially of a safrol which comprises about 30 to 40 weight percent of the column packing.

5. The improved apparatus for conducting analyses of complex hydrocarbon mixtures by gas chromatography which includes an elongated column, an inert ceramic packing in said column, and a stationary liquid phase supported by said packing in said column, said stationary liquid phase consisting essentially of a safrol which comprises a substantial weight percent of the column packing.

6. The method of claim 1 wherein the mixture of volatile materials includes $C_2$–$C_6$ hydrocarbons.

7. The method of claim 2 wherein the complex mixture contains at least two $C_5$ hydrocarbons and wherein such $C_5$ hydrocarbons are separately eluted from the supported stationary liquid phase.

8. The method of claim 2 wherein the stationary safrol liquid phase is maintained at essentially ambient temperature during the analysis.

References Cited in the file of this patent

"Gas Chromatography," The Oil and Gas Journal, December 17, 1956, pages 126 to 140.